United States Patent
Leonidov et al.

(10) Patent No.: US 6,654,463 B1
(45) Date of Patent: Nov. 25, 2003

(54) ROUND TRIP DELAY ESTIMATOR AND COMPENSATOR FOR THE ECHO CANCELLER

(75) Inventors: Alexandre L Leonidov, Skokie, IL (US); Ying Wu, Grass Valley, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,572

(22) Filed: May 28, 1999

(51) Int. Cl.[7] .............................................. H04B 3/23
(52) U.S. Cl. .................................. 379/406.08; 370/290
(58) Field of Search ....................... 379/406.01, 406.04, 379/406.06, 406.08, 406.09; 370/290; 708/322

(56) References Cited

U.S. PATENT DOCUMENTS

| | | | | |
|---|---|---|---|---|
| 4,582,963 A | * | 4/1986 | Danstrom ............... | 379/406.08 |
| 4,736,414 A | * | 4/1988 | Montagna et al. ..... | 379/406.06 |
| 5,307,405 A | | 4/1994 | Sih ........................ | 379/406.08 |
| 5,455,819 A | | 10/1995 | Sugiyama .................. | 370/241 |
| 5,559,881 A | | 9/1996 | Sih ........................ | 379/406.08 |
| 5,592,548 A | | 1/1997 | Sih ........................ | 379/406.08 |
| 5,675,644 A | | 10/1997 | Sih ........................ | 379/406.08 |
| 5,687,229 A | | 11/1997 | Sih ........................ | 379/406.09 |
| 5,790,632 A | | 8/1998 | Antonio et al. ................ | 379/3 |

* cited by examiner

Primary Examiner—Forester W. Isen
Assistant Examiner—Daniel Swerdlow
(74) Attorney, Agent, or Firm—McDonnell Boehnen Hulbert & Berghoff

(57) ABSTRACT

Methods and systems pertaining to estimating and compensating for a round-trip or flat delay portion of an echo channel characteristic in an echo canceller are provided. According to a particular method, a filter coefficient vector of an adaptive filter that models the echo channel characteristic is updated. An instant flat delay is estimated by analyzing the filter coefficient vector after each update, and periodic averages of the instant flat delay estimate are performed. A final flat delay estimate average is determined when the flat delay estimate average has converged. The length of the adaptive filter is adjusted in response to the final flat delay estimate average. Further, an improved echo canceller apparatus that compensates for a flat delay portion of an echo channel characteristic is provided. The improved echo canceller includes an adaptive filter, a position detector, a periodic averager, and a level detector. The adaptive filter has an initial length N. The position detector is connected to the adaptive filter and locates the position of the maximum valued filter tap. The periodic averager is connected to the position detector and provides an average of the location position. The level detector responsive to the periodic averager provides a flat delay estimate, D. The adaptive filter shortens from the initial length N to a length N−D, responsively to the flat delay estimate.

40 Claims, 8 Drawing Sheets

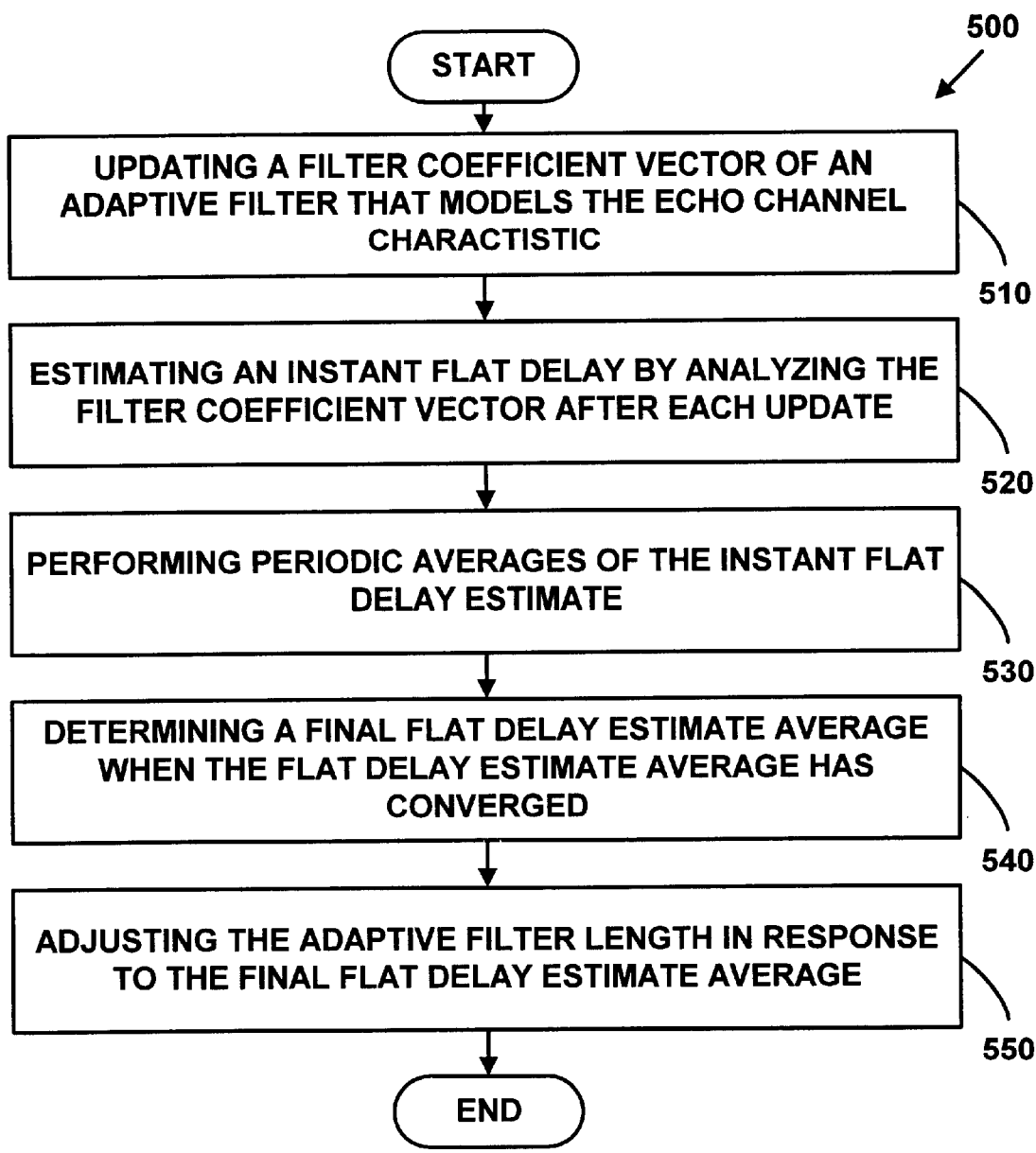

ROUND TRIP DELAY ESTIMATOR AND COMPENSATOR FOR THE ECHO CANCELLER

FIELD OF THE INVENTION

The present invention relates to communications networks. More specifically, it relates to a method and system for estimating and compensating for a flat delay portion of an echo channel characteristic in an echo canceller that uses an adaptive filter to create a local replica of an echo signal.

BACKGROUND OF THE INVENTION

The central offices of Public Switched Telephone Networks employ network hybrids to interface analog subscribers to the local exchange. Typically, a 2-wire full-duplex line connects the subscriber to the central office while the network hybrid provides an interface to the two 2-wire simplex digital transmission network. In this way, data are transmitted to and received from other subscribers who are connected via a 2-wire line to the digital transmission network by another hybrid at the local exchange.

As is known in the art, echo cancellation is often discussed with reference to speech signal communication between a "near end" and a "far end" and vice versa. A person speaking at the "far end" of a telephone connection has her speech sent over the digital transmission network to a person listening (and eventually speaking) at the "near end." A portion of the speech signal that is transmitted from the far end speaker "echoes" off of the network hybrid that is farther away from the far end speaker and closer to the person located at the near end (the near end speaker). In this way, the "near end" hybrid creates an unwanted signal echo of the transmitted far end speech signal and sends it back toward the far end, only to be heard by the far end speaker as an annoying echo of her own voice.

As is known in the art, network echo canceller circuitry is located at both network hybrids (one at the "far end," and one at the "near end"). In the case of far end speaker echo, that is, the echo of a transmitted far end speech signal back to the far end, a network echo canceller at the far end network hybrid (the hybrid closest to the far end speaker) is used to cancel the echo. The echo canceller at the far end generates a local replica of the echo generated by the far end signal as it passes through an echo path, or echo channel. This local replica of the echo is generated and used by the echo canceller to attempt to cancel the echo before it returns to the far end speaker. The echo path or channel is the entire path traveled by the transmitted far end signal as it leaves the far end hybrid, as a portion of it echoes off of the near end hybrid, and as its echo returns back to the far end hybrid. In particular, the echo path or channel represents the outgoing and incoming digital transmission lines as well as the near end network hybrid (the one closest to the near end speaker, and distant from the far end speaker).

In the case of echo from the near end speaker, that is, the echo of a transmitted near end speech signal back to the near end, a network echo canceller at the near end network hybrid (the hybrid closest to the near end speaker) cancels the echo that is generated from a portion of the near end speech signal echoing off of the opposite hybrid (the far end hybrid) and returning toward the network hybrid closest to the near end (the near end hybrid).

A typical network echo canceller employs an adaptive digital transversal filter to model the impulse response of the unknown echo channel so that the echo signal can be cancelled. The echo impulse response coefficients used in the transversal filter are updated to track the characteristics of the unknown echo channel. For reference purposes, network echo cancellers are examined from the point of view of the far end speaker, that is, these cancellers act to minimize far end echo.

Connections over the digital transmission network vary in terms of the distance traveled by the signals from near end to far end or vice versa. For example, relative to a far end speaker initiating a telephone call over the digital transmission network, the distant hybrid (at the near end) may be located anywhere from thirty-five or forty miles to thousands of miles away from the closer hybrid (at the far end). The speech signal sent by the far end speaker will encounter a "round trip" or "flat" delay in its path from the closer hybrid to the distant hybrid and back again as echo to the closer hybrid. Thus, the magnitude and duration of the flat or round trip delay is dependent on the distance traveled by the signals on a particular telephone call, with each telephone connection experiencing a different flat delay. An additional issue is that the magnitude or duration of the flat delay may change during a single telephone call.

The echo canceller at the closer hybrid attempts to cancel the far end speaker echo. The adaptive digital filter used by the echo canceller models the echo channel characteristic including this round trip delay, or "flat" delay, portion of the entire echo path delay. Echo impulse response coefficients must be generated to provide a local replica of the far end speaker echo, but since this channel includes the flat delay, many of these coefficients will be effectively zero. Implementing these coefficients in an adaptive filtering scheme is computationally inefficient since a varying proportion of the echo canceller length is used to account for the flat or round trip delay and contributes little or nothing to an individual actual echo replica sample.

Needed is a computationally efficient technique of estimating and compensating for the flat delay portion of the echo path delay in an echo canceller employing adaptive digital filtering to cancel far end speaker echo.

SUMMARY OF THE INVENTION

In accordance with preferred embodiments of the present invention, the problems associated with estimating and compensating for a flat delay portion of the echo path delay in an echo canceller, are addressed.

A method for estimating and compensating for a flat delay portion of an echo channel characteristic in an echo canceller is provided. A filter coefficient vector of an adaptive filter that models the echo channel characteristic is updated. An instant flat delay is estimated by analyzing the filter coefficient vector after each update, and periodic averages of the instant flat delay estimate are performed. A final flat delay estimate average is determined when the flat delay estimate average has converged. The length of the adaptive filter is adjusted in response to the final flat delay estimate average.

A second method for estimating and compensating for a flat delay portion of an echo channel characteristic in an echo canceller is provided. A far end signal is received into a buffer. A filter coefficient vector $\underline{h}$ of an adaptive filter of initial length N that models the echo channel characteristic is updated. An instant flat delay is estimated by analyzing the filter coefficient vector $\underline{h}$ after each update and determining an index value of the filter coefficient having the largest magnitude. Periodic averages of the instant flat delay estimate are performed. A final flat delay estimate average is determined when the flat delay estimate average has converged and has satisfied an energy requirement. The length of the adaptive filter is shortened in response to the final flat delay estimate average. The far end signal is adaptively filtered using the shortened adaptive filter to create a local replica of a far end signal echo to cancel the far end signal echo.

An improved adaptive filter apparatus that estimates and compensates for a flat delay portion of an echo channel characteristic in an echo canceller is provided. The improved adaptive filter includes a series of delay elements, a filter summer, a coefficient vector generator, a position detector, a periodic averager, and a level detector. The series of delay elements receives a far end signal and the filter summer has initial length N. The coefficient vector generator updates a filter coefficient vector. The coefficient vector generator also shortens the filter summer and the filter coefficient vector and provides a bulk delay element to replace a portion of the series of delay elements, responsively to a final flat delay estimate. The position detector provides an instant flat delay estimate corresponding to the location of the filter coefficient having the largest magnitude after each update of the filter coefficient vector. The periodic averager averages the instant flat delay estimate, and a level detector, responsive to the periodic averager, checks the instant flat delay estimate average to determine the final flat delay estimate.

An improved echo canceller apparatus that compensates for a flat delay portion of an echo channel characteristic is provided. The improved echo canceller includes an adaptive filter, a position detector, a periodic averager, and a level detector. The adaptive filter has an initial length N. The position detector is connected to the adaptive filter and locates the position of the maximum valued filter tap. The periodic averager is connected to the position detector and provides an average of the location position. The level detector responsive to the periodic averager provides a flat delay estimate, D. The adaptive filter shortens from the initial length N to a length N–D, responsively to the flat delay estimate.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments are described with reference to the following drawings, wherein:

FIG. 8 is a flow diagram illustrating a method for estimating and compensating for a flat delay portion of an echo channel characteristic in an echo canceller.

DETAILED DESCRIPTION OF PREFERRED EMBODIMENTS

The central offices of Public Switched Telephone Networks employ network hybrids to interface analog subscribers to the local exchange. Typically, a 2-wire full-duplex line connects the subscriber to the central office while the network hybrid provides a link to the two 2-wire simplex digital transmission network. In this way, data are transmitted to and received from other subscribers who are connected via a 2-wire line to the digital transmission network by another hybrid at the local exchange.

Figure 1:
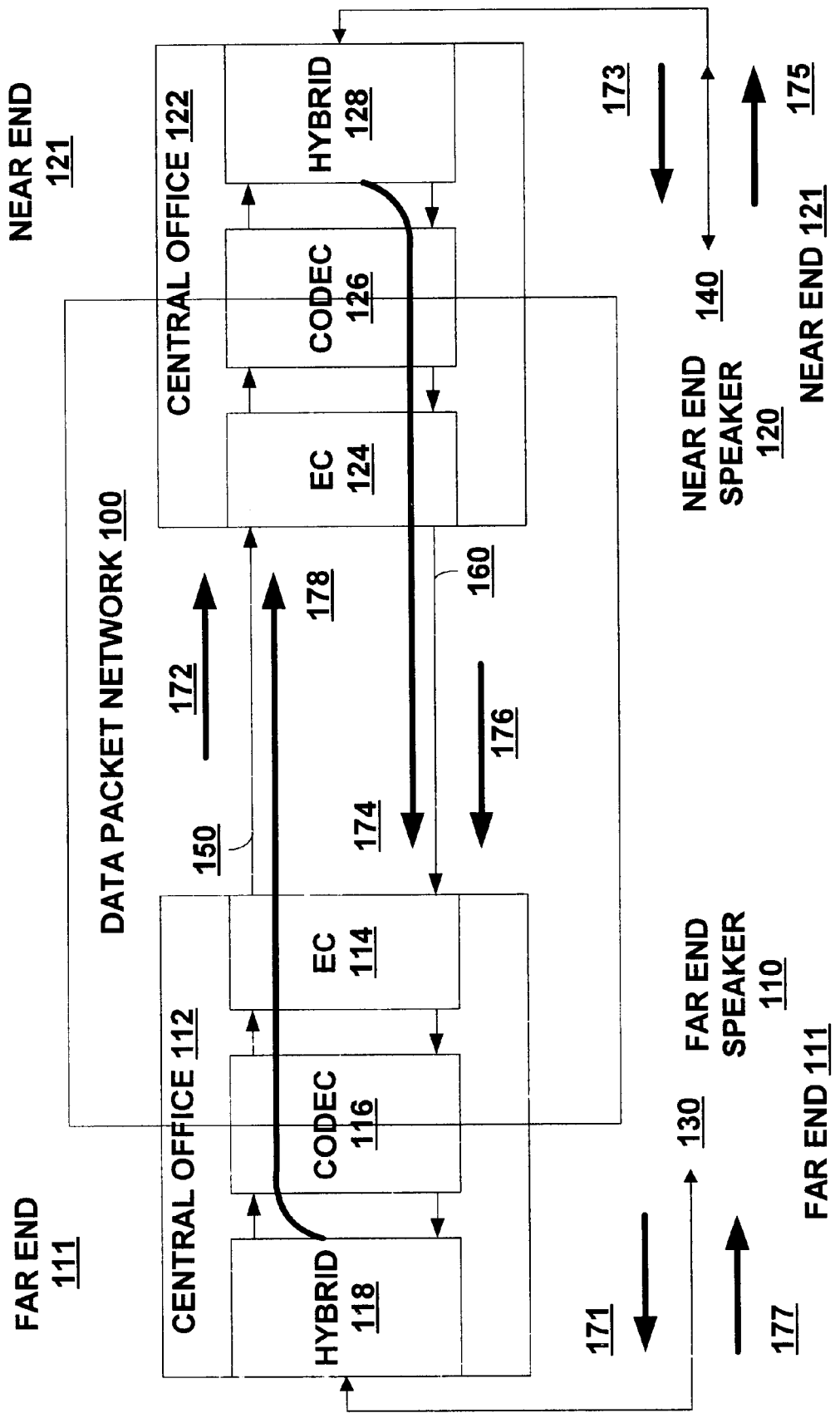
FIG. 1 is a block diagram illustrating communication over an exemplary digital transmission network between a far end speaker and a near end speaker.

FIG. 1 is a block diagram illustrating communication over an exemplary digital transmission network or Data Packet Network ("DPN") 100 between a person speaking at the "far end" 111 of a telephone connection and a speaker at the "near end" 121 (for example). Telephone company Central Offices 112, 122 include among other items not shown in FIG. 1, network Echo Cancellers ("ECs") 114, 124; Codecs 116, 126; and Hybrids 118, 128, respectively. A Far End Speaker 110, communicating with a Near End Speaker 120, transmits an analog speech signal 171 along a far end 2-wire full duplex line 130 to the Central Office 112. The Hybrid 118 at the Central Office 112 closest to the far end 111 interfaces the 2-wire line 130 with a pair of 2-wire simplex lines, 150 (outgoing from the far end 111) and 160 (incoming to the far end 111). The analog speech signal 171 is converted to a digital signal 172 by the Codec 116 also located at the far end Central Office 112. The far end side of the DPN 100 can be defined as the point at which the analog signal 171 is converted to the digital signal 172. The digital signal 172 is received by the EC 114 before exiting the Central Office 112.

The digital signal 172 travels along the 2-wire simplex line 150 through the DPN 100 to the Central Office 122 nearest to the near end. The digital signal 172, after passing through the EC 124, is converted to an analog signal 173 by the Codec 126 located at the Central Office 122. The near end side of the DPN 100 can be defined as the point at which the digital signal 172 is converted to the analog signal 173. The analog signal 173 sent by the Far End Speaker 110 exits the Central Office 122 and travels toward the near end 121 and the Near End Speaker 120 along a 2-wire full duplex line 140.

The network Hybrid 128 that is farthest away from the far end 111 and closest to the near end 121 will create an echo (shown as signal arrow 174 in FIG. 1) of the signal 172 (171) transmitted from the Far End Speaker 110. In this example, this unwanted echo signal 174 is transmitted back across the DPN 100 along a 2-wire simplex line 160 to the far end 111 so that the Far End Speaker 110 hears an annoying echo of her own speech.

As is known in the art, network echo canceller circuitry (EC 114, 124) is located at both Central Offices 112, 122. To cancel the echo signal 174 from the Far End Speaker 110, that is, to cancel the unwanted echo 174 of the transmitted far end speech 1 (171) back toward the far end 111, the EC 114 is located at the Central Office 112 closest to the Far End Speaker 110, as is typically the case. The EC 114 provides and adaptively generates a local replica (not shown in FIG. 1) of the echo signal 174 by modeling the impulse response of the echo path. The echo path or echo channel presented to the far end signal 172 and its far end echo 174 include the outgoing and incoming digital transmission lines (2-wire simplex lines 150 and 160, respectively) and the network Hybrid 122 located closest to the near end 121. The local replica of the echo is used by the EC 114 at the far end Central Office 112 to attempt to cancel the echo before it returns to the Far End Speaker 110.

The echo cancellation process for speech transmitted from the near end 121 proceeds in a similar fashion, but from an opposing perspective. The Near End Speaker 120 transmits an analog speech signal 175 to the Central Office 122. The analog signal 175 passes through Hybrid 128 and is converted to a digital signal 176 by the Codec 126. The digital signal 176 is received into the EC 124 prior to exiting the near end Central Office 122 and traveling along the line 160 to the far end 111. The digital signal 176 is ultimately converted to an analog signal 177 by the Codec 116 at the far end Central Office 112 and is sent to the far end along line 130. A portion, however, of the transmitted near end speech signal 176 (175) echoes off of the network Hybrid 118 closest to the far end 111 as echo signal 178, and returns toward the near end Central Office 122. The EC 124 located at the near end Central Office 122 closest to the Near End Speaker 120 cancels the echo signal 178 that is generated from the speech signal 176 (175) that is transmitted from the near end.

As regards the pair of signals 172, 178 traveling on the 2-wire simplex line 150 and the pair of signals 176, 174 traveling on the 2-wire simplex line 160, it should be understood that the signals within each combined pair were discussed in isolation from each other for clarity of explanation. For example, the signals 172 and 178 are components of the same signal.

For reference purposes and as is known in the art, network echo cancellers can be examined from the point of view of the Far End Speaker 110. That is, an echo canceller minimizes the far end echo so that the Far End Speaker 110 does not hear a noticeable echo of her own voice. Of course, the reverse proposition is true, and the canceller on the opposite end can be examined from the point of view of the Near End Speaker 120, as is evident from the discussion of FIG. 1.

Figure 2:
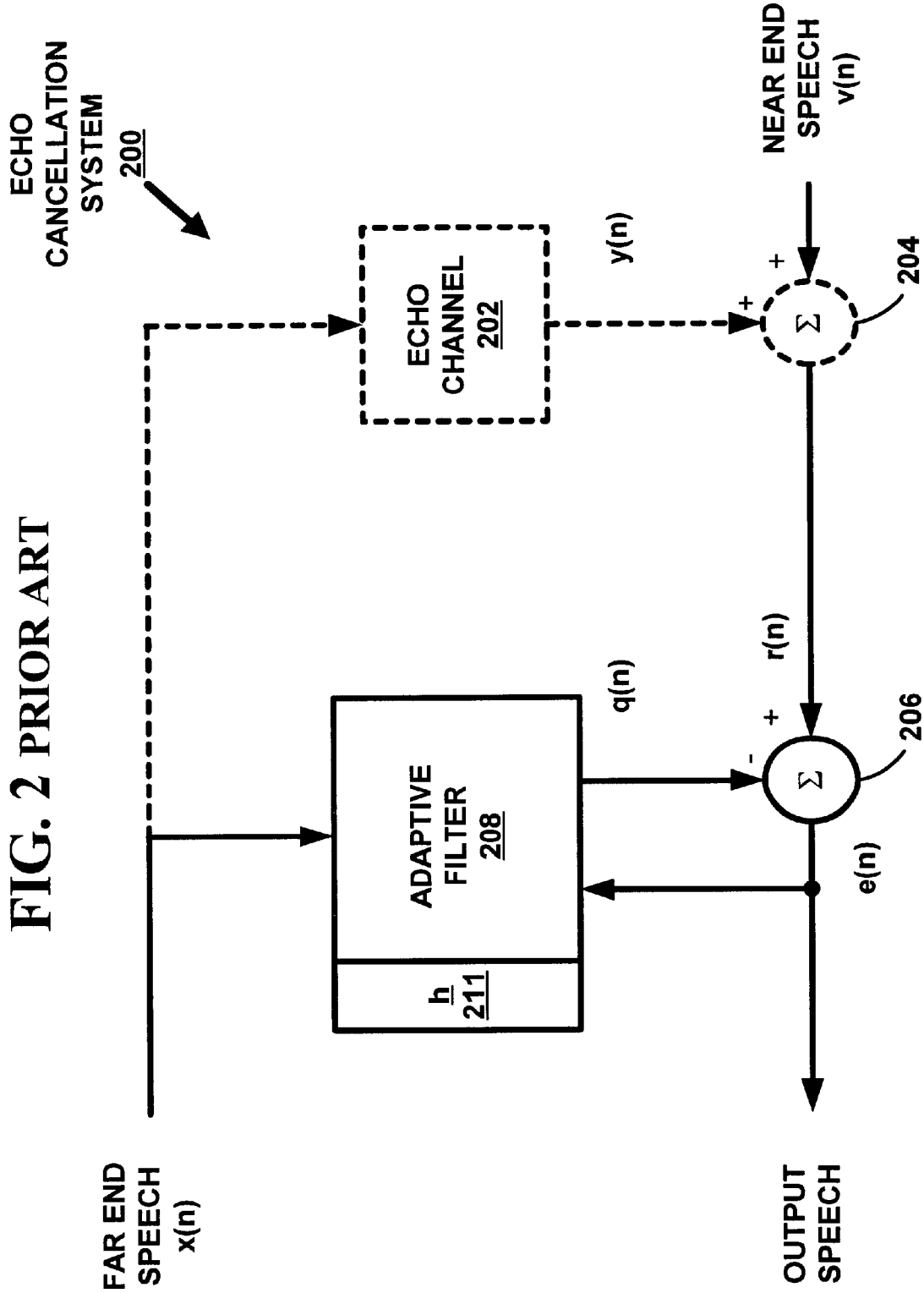
FIG. 2 is a block diagram illustrating an exemplary echo cancellation system.

FIG. 2 is a block diagram illustrating an exemplary echo cancellation system 200. It should be understood that the echo cancellation system 200 of FIG. 2 is analogous to the EC 114 of FIG. 1, with the exception of the dotted lines and elements, and can be viewed instructively with reference to FIG. 1. All signals discussed with reference to FIG. 2 are sampled signals of the form (for example) "a(n)". Although a signal is referred to as the "signal a(n)," it should be understood that "a(n)" can also represent the current sample value of the signal a(n) at an instant n, and that the signal a(n) under discussion may include, for example, a plurality of samples occurring prior to a(n), (i.e. a(n-1), a(n-4), etc.).

An incoming far end speech signal x(n) (analogous to signal 172 in FIG. 1) enters an unknown Echo Channel 202 that is intended to model the entire echo path of the far end speech signal (see signals 172, 174 in FIG. 1). A far end echo signal y(n) (see 174 in FIG. 1) is "generated" from x(n) by the unknown Echo Channel 202 and is output by the Echo Channel 202. The unknown Echo Channel 202 is not an actual functional block; rather it is a model of the echo phenomenon. The far end echo created by the far end network hybrid (see Hybrid 128 in FIG. 1) and the Echo Channel 202 do exist, yet the characteristic response of the echo channel and the values of the far end echo are not known a priori and must be estimated in order for echo cancellation to be effective.

An incoming near end speech signal v(n) (see 176 in FIG. 1) is summed with the far end echo signal y(n) at a Summer 204 to produce a signal r(n) (signal 174 plus signal 176). A high-pass filter (not shown) might follow the Summer 204 to remove low-frequency signal components and background noise present in the signal r(n), i.e. the sum of y(n) and v(n). The Summer 204 is not an actual physically implemented summer, rather it models the combination of the far end signal echo with the near end speech. Generally, unless both the Far End Speaker 110 and the Near End Speaker 120 of FIG. 1 are talking at the same time (doubletalk), only one of y(n) or v(n) will be present and/or significant relative to the other. The echo cancellation system 200 cancels the echo y(n) out of the signal r(n) so that the Far End Speaker 110 of FIG. 1 does not hear an echo of her own voice.

An Adaptive Filter 208 having an impulse response coefficient vector $\underline{h}$ 211 generates a local replica q(n) of the far end speaker echo y(n) to cancel the echo y(n) through the unknown echo channel 202 of FIG. 2. The Adaptive Filter 208 outputs the local replica of the echo y(n), the echo estimate signal q(n). The echo estimate signal q(n) is subtracted from the signal r(n) at a subtract input of a Summer 206 to yield an echo residual signal e(n). The echo residual signal e(n) is the output speech of the echo canceller or echo cancellation system 200. A filter, attenuator, or other non-linear frequency component shaping system block (not shown) may be used to adjust, attenuate or clip the echo residual signal e(n) as desired. That is, the local replica q(n) generated by the Adaptive Filter 208 might not cancel the far end echo signal y(n) in the signal r(n) completely, requiring some adjustment to the echo residual signal e(n).

The Adaptive Filter 208 of FIG. 2 receives the incoming far end speech signal x(n) and the echo residual signal e(n). The Adaptive Filter 208 of FIG. 2, typically implemented as an adaptive digital transversal filter, is used to model the impulse response of the unknown Echo Channel 202 so that the echo signal y(n) can be cancelled. The vector $\underline{h}$ 211 of echo impulse response coefficients used in the Adaptive Filter 208 is updated according to an algorithm or scheme that extracts information about the unknown echo channel 202 from the signals x(n) and e(n), for example. The coefficients of the coefficient vector $\underline{h}$ 211 are progressively updated in order to track the characteristics of the unknown echo channel 202.

Figure 3:
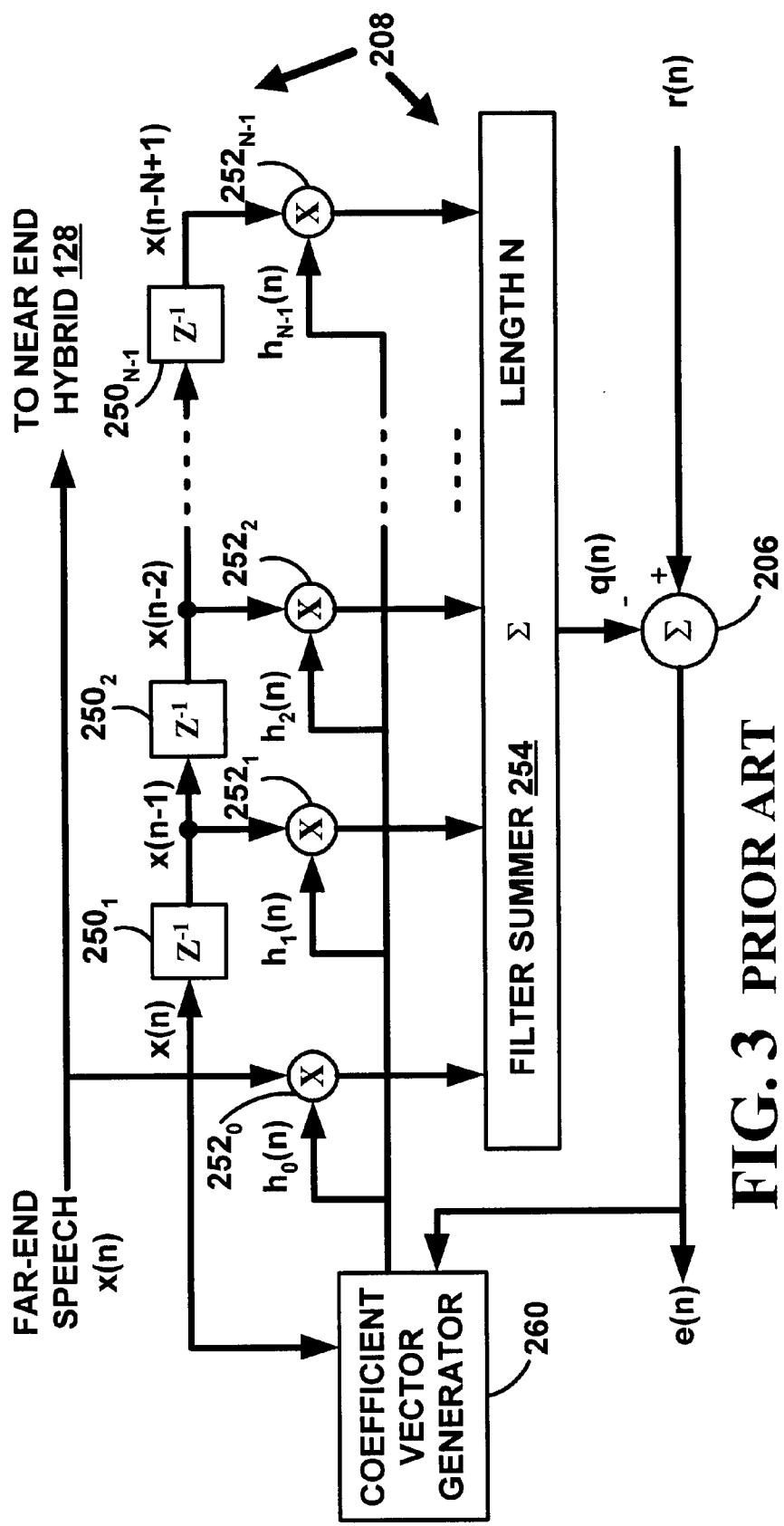
FIG. 3 is a block diagram illustrating an exemplary adaptive transversal filter for use in the echo cancellation system of FIG. 2.

FIG. 3 is a block diagram illustrating an exemplary adaptive transversal filter for use in the echo cancellation system 200 of FIG. 2. In particular, the adaptive transversal filter is an implementation of the Adaptive Filter 208 of FIG. 2. The samples of the far end speech signal x(n) heading toward the near end Hybrid 128 are received into a delay line of N−1 delay elements 250 so that a series of delayed samples of the signal x(n) are presented to the adaptive transversal filter. These N−1 delayed samples, and one current valued sample, can be expressed as a vector $\underline{x}$.

A Coefficient Vector Generator ("CVG") 260 in FIG. 3 updates a vector $\underline{h}$ (analogous to vector $\underline{h}$ 211 of FIG. 2) of echo impulse response coefficients or transversal filter taps according to an algorithm or scheme that extracts information about the unknown echo channel 202 of FIG. 2 from the sampled signals x(n) and e(n), for example. The vector $\underline{h}$ 211 has N impulse response coefficient or filter tap values. The coefficients of the coefficient vector $\underline{h}$ 211 are progressively updated in order to track the characteristics of the unknown echo channel 202 of FIG. 3. As is familiar to those in the art, a Least-Mean Square adaptation algorithm or method is typically used to update the echo impulse response coefficient vector $\underline{h}$ 211.

As described above, the Adaptive Filter 208 shown in FIG. 2 (and implemented in FIG. 3) outputs and generates the echo estimate signal q(n) of the far end speaker echo y(n) to cancel the echo y(n) through the unknown echo channel 202 of FIG. 2. The samples of the far end signal vector $\underline{x}$ and the coefficients of the coefficient vector $\underline{h}$ 211 are multiplied together in a set of N Multipliers 252 and summed together in a Filter Summer 254 of length N as shown in FIG. 3 to arrive at the current sample value of the echo estimate signal q(n). The echo estimate signal q(n) is subtracted from the signal r(n) at a subtract input of the Summer 206 to yield an echo residual signal e(n), as shown in FIGS. 2 and 3.

Referring to FIGS. 2 and 3, the normal operation of the transversal Adaptive Filter 208 can be summarized as follows: for each new sample x(n) of the far end speech signal x(n), the previous samples of the signal x(n) are shifted through the delay line (or buffer, if applicable). The filter coefficient vector 211 $\underline{h}$(n−1) is updated to $\underline{h}$(n) typically according to an algorithm using the prior value of the $\underline{x}$(n) vector ($\underline{x}$(n−1)) and the prior value of the echo residual signal, e(n−1). Finally, a new value of the echo estimate signal q(n) is created to cancel the far end echo y(n) component of the signal r(n) and is subtracted from r(n) at Summer 206 to yield the new value of the echo residual signal, e(n).

Generally speaking, the presence of near end speech interferes with the ability of the Adaptive Filter 208 to properly and accurately model the characteristic response of the unknown echo channel 202 via the coefficient updating process. A near end speech detector (not shown in FIG. 2) is typically used to indicate the presence of near end speech and to provide a control signal (also not shown) to the Adaptive Filter 208 to freeze adaptation and coefficient updating when near end speech is present. Typically, if a near end speech detector (not shown) indicates the presence of near end speech, the CVG 260 well respond to a control signal (also not shown) from the detector and will freeze adaptation of the transversal Adaptive Filter 208, or stop updating the echo impulse response coefficient or filter tap vector $\underline{h}$ 211 for the duration of the period that near end speech is indicated. A variety of near end speech and doubletalk detection techniques and algorithms are well known in the art such as comparing the samples, sample averages, or signal energies of the near end and far end speech signals, or the monitoring of an echo return loss enhancement (ERLE) measurement.

Although a delay line of delay elements 250 is shown in FIG. 3, other implementations for receiving the far end signal x(n) are used, including providing a series of samples longer than the length N of the transversal filter into a buffer (not shown in FIGS. 2 or 3), The buffer (not shown) may or may not be a separate element from the adaptive transversal filter of FIG. 3 or the Adaptive Filter of FIG. 2. A buffer implemented to receive samples of the far end signal x(n) typically will be at least as long as the adaptive filter length N.

Figure 4:
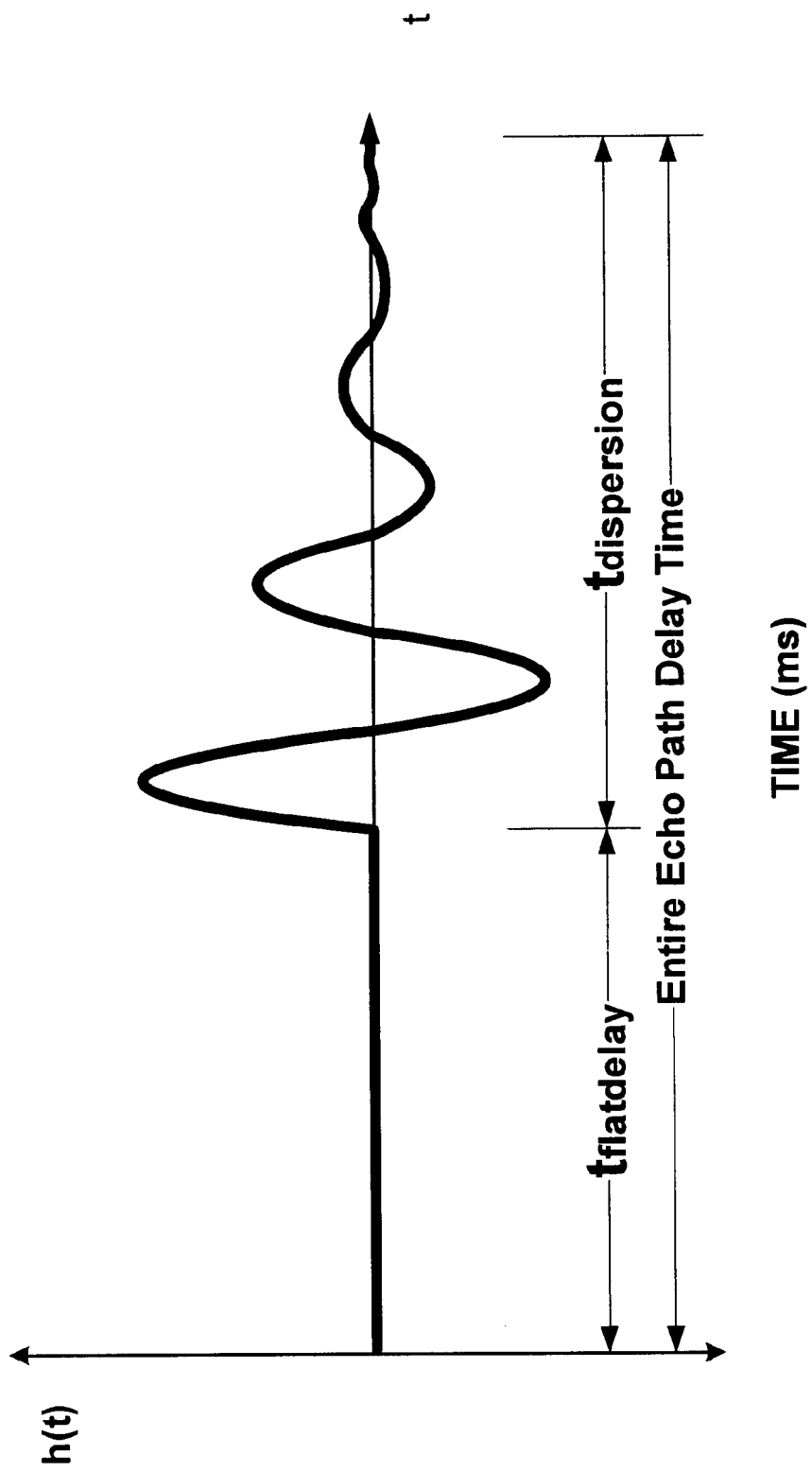
FIG. 4 is an illustration of a simplified exemplary impulse response characteristic h(t) of an echo channel spanning the entire echo path delay time including the flat delay and the echo dispersion portions of the response.

Referring now to FIG. 4, connections over the digital transmission network or DPN 100 of FIG. 1 vary in terms of the distance traveled by the signals from the near end 121 to the far end 111 or vice versa. For example, relative to the Far End Speaker 110 initiating a telephone call to the Near End Speaker 120 over the DPN 100, the distant hybrid (near end Hybrid 128) may be located anywhere from thirty-five or forty miles to thousands of miles away from the closer hybrid (far end Hybrid 118). The far end speech signal x(n) (signal 171 of FIG. 1) sent by the Far End Speaker 110 will encounter a "round trip" or "flat" delay in its path from the closer far end Hybrid 118 to the distant near end Hybrid 128 and back again as echo (the y(n) component of r(n); the signal 174) to the closer far end Hybrid 118. Thus, the magnitude and duration of the flat or round trip delay is dependent on the distance traveled by the signals on a particular telephone call, with each telephone connection experiencing a different flat delay. An additional issue is that the magnitude or duration of the flat delay may change during a single telephone call.

The EC 114 at the far end Central Office 112 attempts to cancel the far end speaker echo signal 174. The Adaptive Filter 208 used by the echo canceller in FIGS. 2 and 3 models the impulse response characteristic h(t) of the unknown Echo Channel 202, including this round trip delay, or "flat" delay, portion of the entire echo path delay, by updating the filter coefficient vector $\underline{h}$(n) 211.

FIG. 4 is an illustration of a simplified exemplary impulse response characteristic h(t) of an echo channel spanning the entire echo path delay time. The echo channel impulse response characteristic h(t) for the entire delay time is shown to have two regions familiar to those in the art, the flat delay region and an echo dispersion region. The flat delay region denotes the flat region of the impulse response, where the impulse response is close to zero. The duration of the flat delay time (also referred to as the round trip delay time) is measured in terms of a time $t_{flat\ delay}$ as shown in FIG. 4. The echo dispersion region includes the active portion of the impulse response of the echo channel, where the impulse has a relatively significant absolute magnitude, i.e. where the echo of the far end signal is created. The duration of the dispersion time is measured in terms of a time $t_{dispersion}$, also shown in FIG. 4.

Echo impulse response coefficients must be generated by the Adaptive Filter 208 to provide a local replica q(n) of the far end speaker echo signal y(n), but since this channel includes the flat delay, many of these coefficients will be effectively zero. Implementing these coefficients in an adaptive filtering scheme is computationally inefficient since a varying proportion of the echo canceller length is used to account for the flat or round trip delay and contributes little or nothing to an individual actual echo replica sample.

Needed is a computationally efficient technique of estimating and compensating for the flat delay portion of the echo path delay in an echo canceller employing adaptive digital filtering to cancel far end speaker echo.

Figure 5:
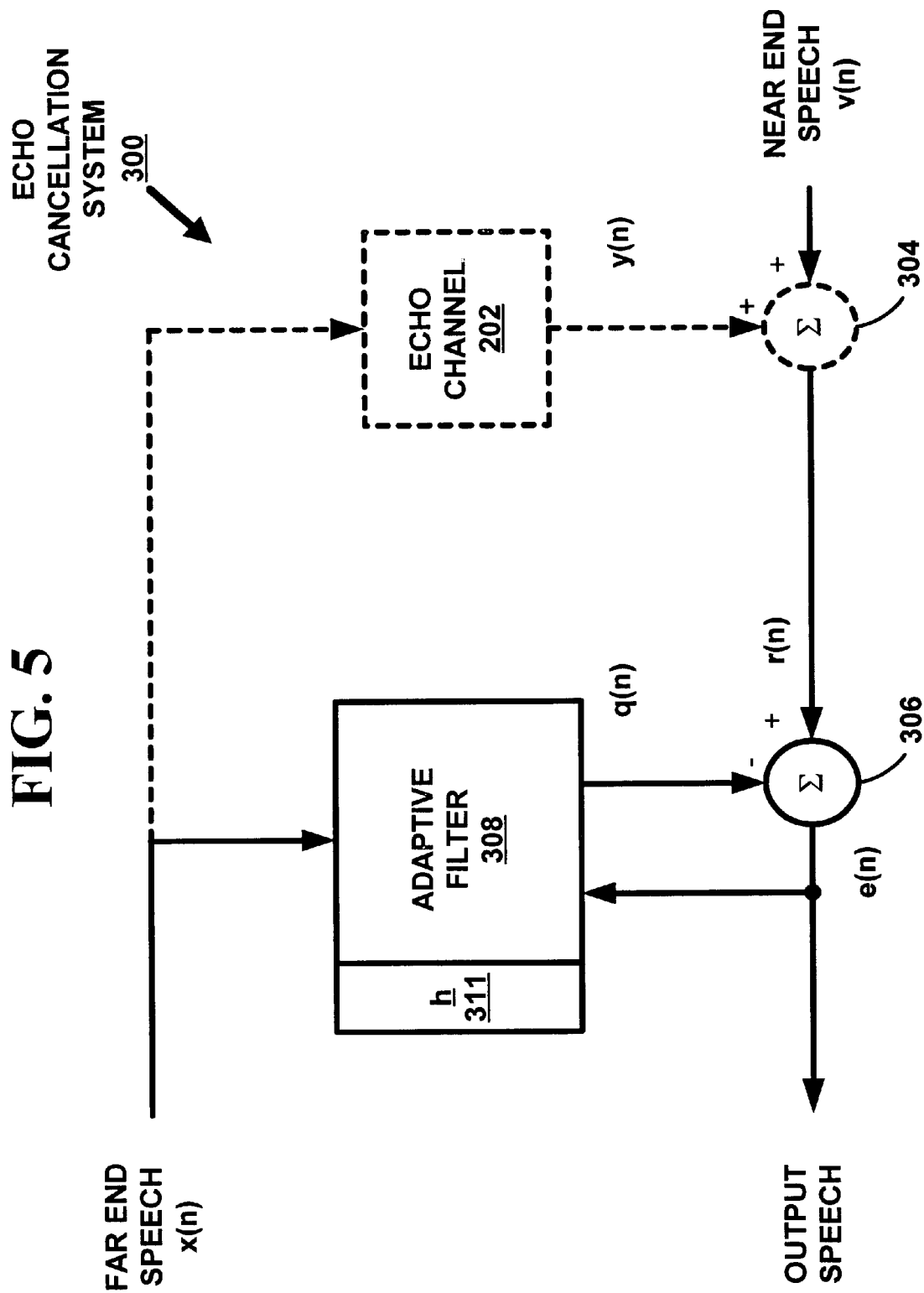
FIG. 5 is a block diagram illustrating a preferred embodiment of an echo cancellation system.

FIG. 5 is a block diagram illustrating an echo cancellation system or echo canceller 300. A far end speech signal x(n) passes through the unknown Echo Channel 202, thus creating a far end echo signal y(n) that is combined with a near end speech signal v(n) at the Summer 204 to form a signal r(n). An Adaptive Filter 308 generates and updates a filter tap coefficient vector 311 to model the characteristic impulse response of the Echo Channel 202 so that the far end speech signal x(n) can be adaptively filtered to create a local replica of the far end echo, or an echo estimate signal q(n). A near end speech indicator (not shown) in FIG. 5, may be used to indicate, declare, or detect near end speech by a variety of techniques, including monitoring the relative magnitudes of the samples of the far end speech signal x(n) and the signal r(n) (which contains the near end speech signal v(n). This indicator may be used to freeze the adaptation of the Adaptive Filter 308 and to halt the updating of the filter tap coefficient vector $\underline{h}$ 311, if the presence of near end speech is indicated. The echo estimate signal q(n) is summed at a Summer 306 with the signal r(n) to generate an echo residual signal e(n). This echo residual signal is finally used as the output speech signal of the echo cancellation system 300 and is also utilized by the Adaptive Filter 308 for adaptation and coefficient updating.

Figure 6:
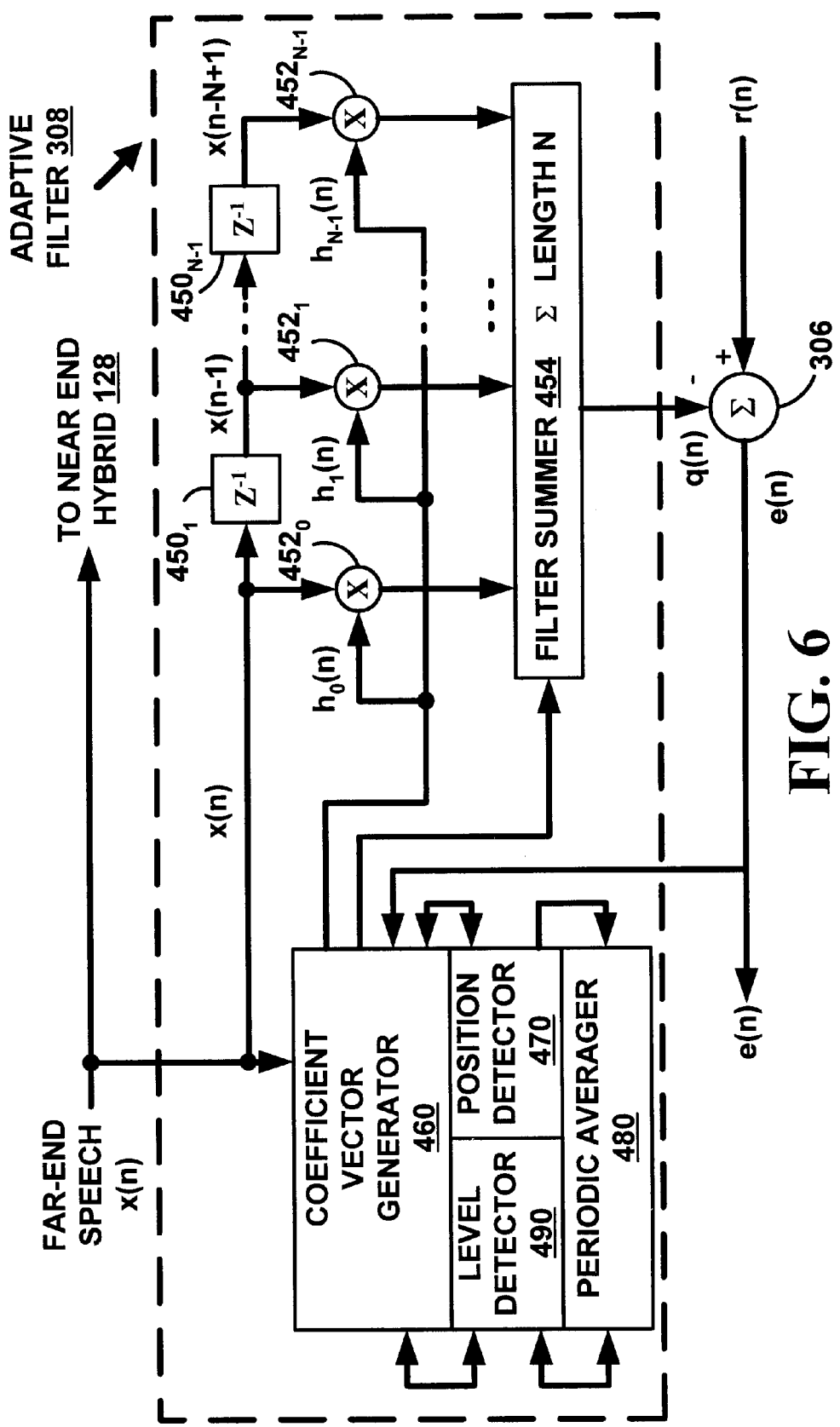
FIG. 6 is a block diagram illustrating an adaptive transversal filter for use in the echo cancellation system of FIG. 5.

FIG. 6 is a block diagram illustrating a transversal adaptive filter that can be used to implement the Adaptive Filter 308 of the echo cancellation system 300 of FIG. 5. The Adaptive Filter 308 includes a delay line of N−1 delay elements 450, a Coefficient Vector Generator ("CVG") 460, a set of N multipliers 452, a Filter Summer 454 having length N, a Position Detector 470, a Periodic Averager 480, and a Level Detector 490.

The samples of the far end speech signal x(n) heading toward the near end Hybrid 128 are received into the delay line of N−1 delay elements 450 so that a series of delayed samples of the signal x(n) are presented to the set of N multipliers 452 in the Adaptive Filter 308. These N−1 delayed samples, and one current valued sample, can be expressed as a vector $\underline{x}$:

$$\underline{x}(n) = <x(n), x(n-1), x(n-2), \ldots, x(n-N+1)> \quad (1).$$

The CVG 460 in FIG. 6 updates a vector $\underline{h}$ 311 (as shown in FIG. 5) of echo impulse response coefficients or transversal filter taps according to an algorithm or scheme that extracts information about the unknown echo channel 202 of FIG. 5 from the sampled signals x(n) and e(n), for example. The vector $\underline{h}$ 311 has N impulse response coefficient or filter tap values:

$$\underline{h}(n) = <h_0(n), h_1(n), h_2(n), \ldots, h_{N-1}(n)> \quad (2).$$

The coefficients of the coefficient vector $\underline{h}$ 311 in equation (2) are progressively updated in order to track the characteristics of the unknown echo channel 202 of FIG. 5. As is familiar to those in the art, a Least-Mean Square adaptation algorithm or method is typically used to update the echo impulse response coefficient vector $\underline{h}$ 311.

The Adaptive Filter 308 shown in FIG. 5 (and implemented in FIG. 6) outputs and generates the echo estimate signal q(n) of the far end speaker echo y(n) to cancel the echo y(n) through the unknown echo channel 202 of FIG. 5. The samples of the far end signal vector $\underline{x}$ in equation (1) and the coefficients of the coefficient vector $\underline{h}$ 311 in equation (2) are multiplied together in the set of N Multipliers 452 and summed together in the Filter Summer 454 of length N as shown in FIG. 6 to arrive at the echo estimate signal q(n) according to:

$$q(n) = \sum_{i=0}^{N-1} x(n-i) h_i(n). \quad (3)$$

for the current sample of q(n). The echo estimate signal q(n) is subtracted from the signal r(n) at a subtract input of the Summer 306 to yield an echo residual signal e(n), as shown in FIGS. 5 and 6. The Filter Summer 454 of length N is connected to and is responsive to the CVG 460.

Referring to FIGS. 5 and 6, the normal operation of the transversal Adaptive Filter 308 can be summarized as follows: for each new sample x(n) of the far end speech signal x(n), the previous samples of the signal x(n) are shifted through the delay line (or buffer, if applicable). The filter coefficient vector 311 $\underline{h}$(n−1) is updated to $\underline{h}$(n) typically according to an algorithm using the prior value of the $\underline{x}$(n) vector ($\underline{x}$(n−1)) and the prior value of the echo residual signal, e(n−1). Finally, a new value of the echo estimate signal q(n) is created to cancel the far end echo y(n) component of the signal r(n) and is subtracted from r(n) at the Summer 306 to yield the new value of the echo residual signal, e(n).

Generally speaking, the presence of near end speech interferes with the ability of the Adaptive Filter 308 to properly and accurately model the characteristic response of the unknown echo channel 202 via the coefficient updating process. A near end speech detector (not shown in FIG. 5) is typically used to indicate the presence of near end speech and to provide a control signal (also not shown) to the Adaptive Filter 308 to freeze adaptation and coefficient updating when near end speech is present. Typically, if a near end speech detector (not shown) indicates the presence of near end speech, the CVG 460 will respond to a control signal (also not shown) from the detector and will freeze adaptation of the transversal Adaptive Filter 308, or stop updating the echo impulse response coefficient or filter tap vector $\underline{h}$ 311 for the duration of the period that near end speech is indicated. A variety of near end speech and doubletalk detection techniques and algorithms are well known in the art such as comparing the samples, sample averages, or signal energies of the near end and far end speech signals, or the monitoring of an echo return loss enhancement (ERLE) measurement.

Although a delay line of delay elements 450 is shown in FIG. 6, other implementations for receiving the far end signal x(n) are used, including providing a series of samples longer than the length N of the transversal filter into a buffer (not shown in FIGS. 5 or 6), The buffer (not shown) may or may not be a separate element from the adaptive transversal filter implementation in FIG. 6 of the Adaptive Filter 308 of FIG. 5. A buffer implemented to receive samples of the far end signal x(n) typically will be at least as long as the adaptive filter length N.

Figure 7:
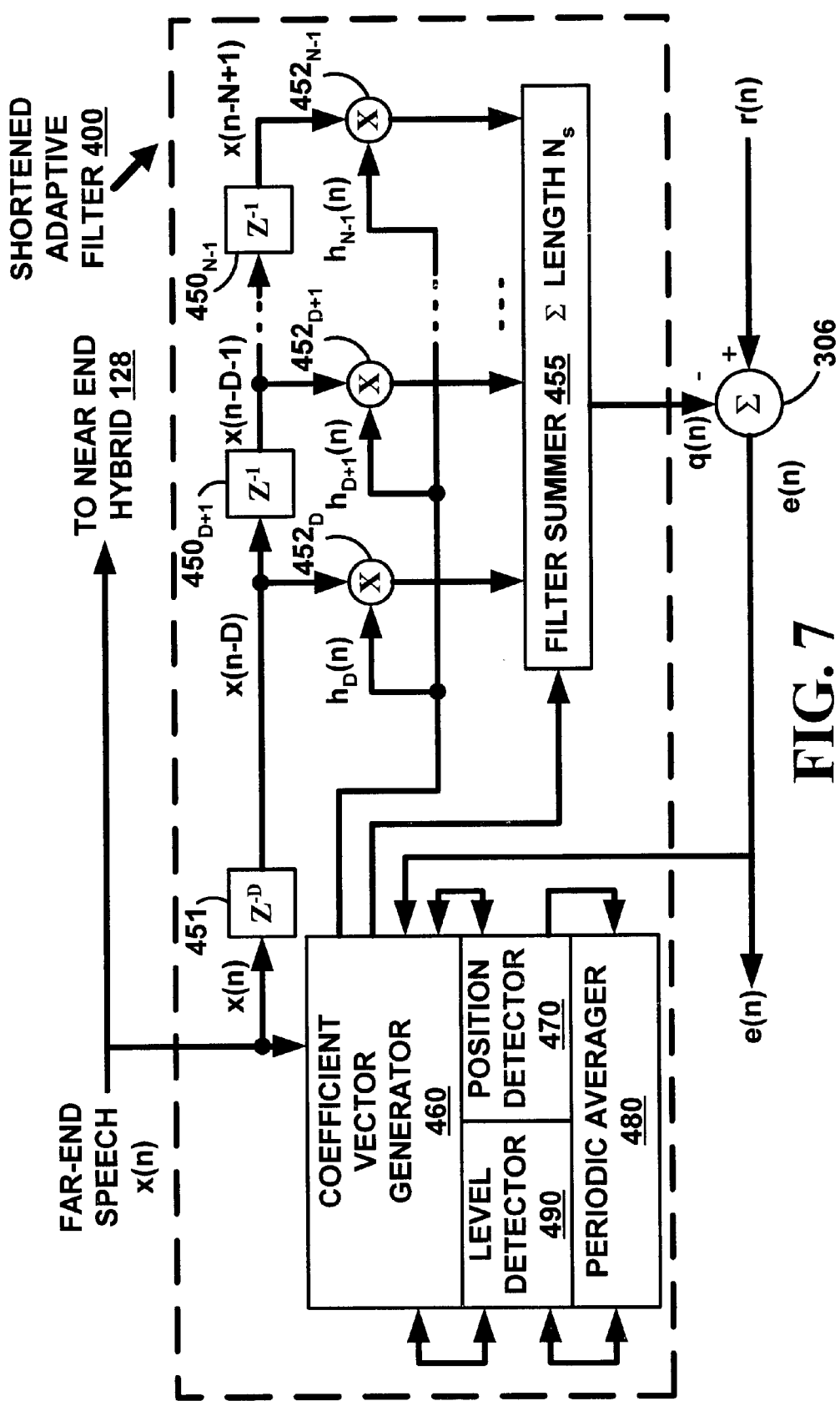
FIG. 7 is a block diagram illustrating a shortened adaptive transversal filter for use in the echo cancellation system of FIG. 5.

As shown in FIG. 6, the Position Detector 470 is connected to the CVG 460. The Periodic Averager 480 is connected to and is responsive to the Position Detector 470. The Level Detector 490 is connected to the Periodic Averager 480 and the CVG 460. It should be understood that although the Position Detector 470, the Periodic Averager 480, and the Level Detector 490 are shown in FIGS. 6 and 7 (and by implication, FIG. 5) as internal to the Adaptive Filter 308 (or Shortened Adaptive Filter 400), the preferred embodiments are not limited to this. In other preferred embodiments, some or all of the Position Detector 470, the Periodic Averager 480, and the Level Detector 490 are located externally (not shown) to the Adaptive Filter 308 (or Shortened Adaptive Filter 400), and preferably will be included within echo cancellation system 300.

According to a preferred embodiment of the Adaptive Filter 308 illustrated in FIGS. 5 and 6 (and the Shortened Adaptive Filter 400 of FIG. 7 described below), an improved adaptive filter apparatus that estimates and compensates for a flat delay portion of an echo channel characteristic in an echo canceller is provided. The improved Adaptive Filter 308 includes the series of delay elements 450 in the delay line, the Filter Summer 454, the CVG 460, the Position Detector 470, the Periodic Averager 480, and the Level Detector 490. The series of delay elements 450 in the delay line receives a far end signal x(n) and the Filter Summer 454 has initial length N. The CVG 460 updates a filter coefficient vector(vector $\underline{h}$ 311 of FIG. 5). The CVG 460 also shortens the Filter Summer 454 and the filter coefficient vector $\underline{h}$ 311 and provides a Bulk Delay Element 451 (see FIG. 7, described below) to replace a portion of the series of delay elements 450 in the delay line, responsively to a final flat delay estimate D (also FIG. 7). The Position Detector 470 provides an instant flat delay estimate (not shown) corresponding to the location of the filter coefficient having the largest magnitude after each update of the filter coefficient vector h 311. The Periodic Averager 480 averages the instant flat delay estimate, and the Level Detector 490, responsive to the Periodic Averager 480, checks the instant flat delay estimate average (from the Periodic Averager 480) to determine the final flat delay estimate.

A preferred embodiment of the echo cancellation system 300 of FIG. 5 including the Adaptive Filter 308 of FIGS. 5 and 6 (and the Shortened Adaptive Filter 400 of FIG. 7 described below) includes an improved echo canceller apparatus that compensates for a flat delay portion of an echo channel characteristic. The improved echo canceller 300 includes the Adaptive filter 308, a Position Detector 470, a Periodic Averager 480, and a Level Detector 490. The Adaptive Filter 308 has an initial length N. The Position Detector 470 is connected to the adaptive filter and locates the position of the maximum valued filter tap. The Periodic Averager 480 is connected to the Position Detector 480 and provides an average of the location position. The Level Detector 490, responsive to the Periodic Averager 480, provides a flat delay estimate, D. The Adaptive Filter 308 shortens from the initial length N (i.e., becomes the Shortened Adaptive Filter 400) to the length N−D, responsively to the flat delay estimate. The Shortened Adaptive Filter 400 of FIG. 7 below has length N, equivalent to N−D.

FIG. 7 is a block diagram illustrating a shortened version of the adaptive transversal filter shown in FIG. 6, also for use in the echo cancellation system 300 of FIG. 5. A Shortened Adaptive Filter 400 shown in FIG. 7, is a shortened version of the Adaptive Filter 308 according to the preferred embodiment. The operation and the elements of the Shortened Adaptive Filter 400 are similar and in most cases identical to Adaptive Filter 308 except for the recited and described variations due to the shortening or adjustment. The Filter Summer 455 (mentioned above) having length $N_s$ is shown in FIG. 7 and is a shortened version of the Filter Summer 454 having length N of FIG. 6. The Filter Summer 455 is connected to the CVG 460 and is preferably responsive to the CVG 460 and was shortened from the Filter Summer 454 according to directions from the CVG 460. The Bulk Delay Element 451 (mentioned above) having a delay of D (equivalent to the flat delay estimate D mentioned above) is provided by the CVG 460 to delay the samples of the far end signal x(n) in order to compensate for the estimated flat delay. Of course, it should be understood that D delay stages similar to the series of delay stages 450 in the delay line of FIG. 6 could be cascaded together (not shown in FIG. 7), instead of one delay stage or Bulk Delay Element 451 having a delay of D, to receive and delay the incoming samples of x(n).

In FIG. 7, the samples of the far end speech signal x(n) heading toward the near end Hybrid 128 are delayed by the Bulk Delay Element 451 having a delay of D and are received into a shortened delay line of N−1−D (or $N_s−1$) delay elements 450 so that a series of delayed samples of the signal x(n) are presented to the set of N−D (or $N_s$) multipliers 452 in the Adaptive Filter 308. These N−1−D (or $N_s−1$) delayed samples, and one sample exiting the Bulk Delay Element 451, can be expressed as a shortened vector x':

$$\underline{x}'(n)=<x'(n), x'(n-1), \ldots, x'(n-N_s)> \quad (4)$$

or, alternatively, using the notation shown in FIG. 7, $$\underline{x}'(n)=<x(n-D), x(n-D-1), \ldots, x(n-N+1)> \quad (5).$$

The CVG 460 in FIG. 7 updates a shortened version h' of the vector h 311. The shortened version h' of the vector h 311 has N−D (or $N_s$) impulse response coefficients that correspond to the estimated non-flat delay portion, or echo dispersion portion of the entire echo path delay of the echo channel characteristic:

$$\underline{h}'(n)=<h'_0(n), h'_1(n), \ldots, h'_{N_s-1}(n)> \quad (6)$$

or, alternatively, using the notation shown in FIG. 7, $$\underline{h}'(n)=<h_D(n), h_{D+1}(n), \ldots, h_{N-1}(n)> \quad (7).$$

These coefficients correspond to the estimated non-flat delay portion, or echo dispersion portion of the entire echo path delay of the echo channel characteristic as modeled by the entire vector h 311. The coefficients of the shortened version h' of the coefficient vector h 311 in equation (2) are progressively updated in order to track the characteristics of the unknown echo channel 202 of FIG. 5. As is familiar to those in the art, a Least-Mean Square adaptation algorithm or method is typically used to update the echo impulse response coefficient vector h 311.

The samples of the shortened far end signal vector x' of equations (4,5) and the coefficients of the shortened version h' (of the coefficient vector h 311) of equations (6,7) are multiplied together in the set of N−D (or $N_s$) Multipliers 452 and summed together in the shortened Filter Summer 455 of length $N_s$ as shown in FIG. 7 to arrive at the echo estimate signal q(n), the current sample of which is now calculated according to:

$$q(n) = \sum_{i=D}^{N-1} x(n-i)h_i(n) = \sum_{i=0}^{N_s-1} x'(n-i)h'_i(n). \quad (8)$$

The echo estimate signal q(n) is subtracted from the signal r(n) at a subtract input of the Summer 306 to yield an echo residual signal e(n), as shown in FIGS. 5, 6, and 7.

FIG. 8 is a flow diagram illustrating a Method 500 for estimating and compensating for a flat delay portion of an echo channel characteristic in an echo canceller. The Method 500 includes: updating a filter coefficient vector of an adaptive filter that models the echo channel characteristic (Step 510); estimating an instant flat delay by analyzing the filter coefficient vector after each update (Step 520); performing periodic averages of the instant flat delay estimate (Step 530); determining a final flat delay estimate average when the flat delay estimate average has converged (at Step 540); and adjusting the adaptive filter length in response to the final flat delay estimate average (at Step 550).

At Step 510, a filter coefficient vector of an adaptive filter that models the echo channel characteristic is updated. Preferably, the adaptive filter has an initial length N. Preferably, the initial length N is not less than an expected value of the entire delay of the echo channel characteristic. For example, as is known to those of skill in the art, the approximate maximum entire delay of the echo channel characteristic, or entire echo path delay of a telephone call between two parties in the continental United States is 64 milliseconds (Ms). Preferably, the filter coefficient vector is updated according to a least mean square algorithm.

At Step 520, an instant flat delay is estimated by analyzing the filter coefficient vector after each update. Preferably, estimating the instant flat delay includes analyzing the filter coefficient vector after each update of the filter coefficient vector in Step 510. In addition to analyzing the filter coefficient vector after each update, estimating the instant flat delay can include a variety of approaches. Preferably, an index value of the filter coefficient (of the filter coefficient vector) having the largest magnitude is determined. An alternative preferred approach includes determining a sequence of indices, where each index corresponds to the location of the filter coefficient (of the filter coefficient vector) having the largest magnitude. Another preferred approach includes determining the location of the filter coefficient having the largest magnitude, where the location may be an index location. A further preferred approach includes determining the filter coefficient having the largest magnitude. Still another preferred approach includes counting the number of samples to the filter coefficient having the largest magnitude. Yet another preferred approach includes determining a delay associated with the filter coefficient having the largest magnitude. Preferably, the index value of the filter coefficient (of the filter coefficient vector, $\underline{h}$) having the largest magnitude is determined according to the following equation:

$$d_{inst} = \arg\max(|h_i(n)|) \text{ for } i=0,1,\ldots,N-1 \tag{9}$$

where:
  i is the index value of the i th filter coefficient of the adaptive filter having an initial length N;
  $|h_i(n)|$ is the absolute value of the i th filter coefficient of the filter coefficient vector h; and
  $d_{inst}$ is an instant flat delay estimate.

At Step 530, periodic averages of the instant flat delay estimate are performed. Preferably, the averages of the instant flat delay estimate are performed after each update (at Step 510) of the filter coefficient vector. Preferably performing the periodic averages of the instant flat delay includes calculating a weighted average of the instant flat delay estimates of Step 520. An alternative preferred calculation is a time average of the past Q instant flat delay estimates. Yet another preferred calculation is an average calculated according to a smoothing and noise reduction function. Referring to the sequence of indices of Step 520, the periodic averaging can also be performed by filtering the sequence of indices to obtain a sequence of averages. An alternative preferred approach includes determining a sequence of indices, where each index corresponds to the location of the filter coefficient (of the filter coefficient vector) having the largest magnitude. Another preferred approach to performing the periodic averages of the instant flat delay includes performing the periodic averages using a filter. The filter can be an integrator, where preferably the integrator integrates the instant flat delay estimate for an integration time $T_{int}$. As an another preferred alternative, the filter can be a recursive filter, such as an Infinite Impulse Response (IIR) filter. The filter can also be an Finite Impulse Response (FIR) filter. Preferably, the periodic averages of the flat delay estimate includes averaging the instant flat delay estimate $d_{inst}$ of Step 520 and equation (9) according to:

$$rtd(n) = [1-\beta]rtd(n-1) + \beta d_{inst} \tag{10}$$

where:
  rtd(n) is a flat delay estimate average;
  rtd(n−1) is a previous value of the flat delay estimate average
  β is a weighting factor for the averaging and does not exceed one.

Preferably, the averaging of equation (10) is repeated for a predetermined time $T_{avg}$.

It should be understood that in a preferred embodiment of the invention, the instant flat delay estimate $d_{inst}$ and the flat delay estimate average rtd(n) represent index values corresponding to particular filter tap coefficients of the filter tap coefficient vector (for example, the vector $\underline{h}$ 311 in FIG. 5).

At Step 540, a final flat delay estimate average is determined when the flat delay estimate average has converged. Preferably, comparing an absolute difference value of the most recent instant flat delay estimate ($d_{inst}$ at Step 520) and the flat delay estimate average (rtd(n) at Step 530) to a threshold value is indicative of the convergence of the flat delay estimate average. Further, preferably the flat delay estimate average has converged when an absolute difference value of the most recent instant flat delay estimate ($d_{inst}$ at Step 520) and the flat delay estimate average (rtd(n) at Step 530) does not exceed a threshold value. Preferably, the flat delay estimate average has converged when the following inequality has been satisfied:

$$|rtd(n) - d_{inst}| \leq \text{Threshold}_{difference} \tag{11}$$

where the value of Threshold$_{difference}$ is preferably a predetermined value. Preferably, if the relationship in equation (11) is not satisfied, the step of performing periodic averages at Step 530 is repeated until equation (11) is satisfied.

In another preferred embodiment of the Method 500 (not shown in FIG. 7), Step 540 includes instead determining a final flat delay estimate average when the flat delay estimate average has satisfied an energy requirement. One preferred approach determines that the flat delay estimate average has satisfied the energy requirement when a sufficient amount of energy of the updated filter coefficient vector is concentrated in the vicinity of the flat delay estimate average. Preferably, comparing a calculated ratio, of the energy of the filter coefficients within a range surrounding the flat delay estimate average to the energy of all of the filter coefficients of the updated filter coefficient vector, is indicative of satisfying the energy requirement. Further, preferably, the flat delay estimate average has satisfied the energy requirement when this calculated ratio exceeds a threshold value. Preferably, the range surrounding the flat delay estimate average has a length $N_e$ that is less than the initial length N of the adaptive filter, that is:

$$N_e < N \tag{12}$$

Preferably the ratio is calculated under the restriction in equation (12) and according to the following energy summations:

$$E_{peak} = \sum_{rtd(n)-N_e/2}^{rtd(n)+N_e/2} (h_i(n))^2 \tag{13}$$

and $$E_h = \sum_{i=0}^{N-1} (h_i(n))^2, \tag{14}$$

where:
  $E_{peak}$ is the energy of the filter coefficients within the range having length $N_e$ and surrounding the flat delay estimate average;
  $E_h$ is the energy of all of the filter coefficients of the updated filter coefficient vector; and
  $E_{peak}/E_h$ is the calculated ratio.

Preferably, the flat delay estimate average has satisfied the energy requirement when the following inequality has been satisfied:

$$|rtd(n) - d_{inst}| > \text{Threshold}_{energy} \tag{15}$$

where the value of Threshold$_{energy}$ is preferably a predetermined value. Preferably, if the relationship in equation (15) is not satisfied, the step of performing periodic average at Step 530 is repeated until equation (15) is satisfied.

Preferably, the final flat delay estimate average is determined when the flat delay estimate average has converged as above and has satisfied an energy requirement. In other preferred embodiments of the Method 500, however, the final flat delay estimate average is determined solely according to when the flat delay estimate average has satisfied an energy requirement. The Method 500 is not limited to either criterion, although preferably both are used. Further, preferably the question of convergence is examined before the satisfaction of the energy requirement is considered.

Preferably, the final flat delay estimate average is determined when the flat delay estimate average has converged according to the relationship in equation (11) and has satisfied the energy requirement according to the relationship in equation (15). Preferably, if the relationship in equation (11) is not satisfied, the step of performing periodic averages at Step 530 is repeated until equation (11) is satisfied. Preferably, once the relationship in equation (11) has been satisfied, the relationship in equation (15) must be met. If the relationship in equation (15) is not satisfied, the step of performing periodic averages at Step 530 is repeated until the relationships or criteria in equations (11) and (15) are met or satisfied and the final delay estimate average determined.

At Step 550, the length of the adaptive filter is adjusted in response to the final flat delay estimate average. Preferably, the adjustment of the filter includes shortening the adaptive filter in response to the final flat delay estimate average. Preferably, shortening the adaptive filter includes replacing a beginning portion of the adaptive filter with a bulk delay element. Further, preferably, the beginning portion of the shortened adaptive filter is determined by using the first filter coefficient of the filter coefficient vector through to a filter coefficient that is located at a safety or error margin prior to the filter coefficient indicated by the final flat delay estimate average (rtd(n), for example). Still further, this margin of error or safety margin can be determined according to a variety of techniques. One preferred approach is specifying that the safety margin include a predetermined number of filter coefficients. Another preferred technique is determining the safety or error margin based on a fixed percentage of the filter taps ranging from the filter coefficient indicated by the final flat delay estimate average to the last filter coefficient of the filter coefficient vector, inclusive. Preferably, this fixed percentage upon which the determination of the safety or error margin will be anywhere from zero to twenty percent of the non-flat delay portion, or echo dispersion portion of the entire echo channel characteristic.

Preferably the adaptive filter having length N is shortened to a length $N_s$, where $N_s$ is equivalent to N−D, and where D represents a final flat delay value. This final flat delay value can be the final flat delay estimate average, determined at Step 540. However, the safety or error margin discussed above can be incorporated in the calculation of the final flat delay value D. A general development of a preferred embodiment proceeds having an adaptive filter of initial length equal to N, and a shortened filter of length $N_s$ equivalent to:

$N_s$=[N−(final flat delay estimate average)+(safety of even error margin)]=[N−D]

where

D=[(final flat delay estimate average)−(safety or error margin)]

and where the safety or error margin is preferably equivalent to:

[(fixed percentage from 0–20 percent)*(N−(final flat delay estimate average))].

For example, using time values instead of filter coefficient index values, assuming the final flat delay estimate average is 30 milliseconds (ms) and the total echo path delay is 65 ms, and the initial length N of the filter is 65 ms, then the non-flat or echo dispersion portion of the total echo path delay will be:

65 ms−30 ms=35 ms, from the final flat delay estimate average of 40 ms to the end (65 ms). Assuming a fixed percentage of twenty percent to determine the safety margin, the safety margin will be:

safety margin=(0.2)*(35 ms)=7 ms.

The final flat delay value D will be equivalent to:

D=[(final flat delay estimate average)−(safety or error margin)]=30 ms−7 ms=23 ms and the shortened adaptive filter length $N_s$ will be equivalent to:

$N_s$=[N−D]=65 ms−23 ms=42 ms. It should be understood that the preceding example is presented to clarify a preferred embodiment.

Preferably another step (not shown in FIG. 8) is performed according to the Method 500. The step includes receiving a far end signal into a buffer. Preferably, the far end signal is received into a buffer of length N. The far end signal is preferably received on a sample by sample basis into the buffer. Other implementations for receiving the far end signal than the buffer can be used with the Method 500, including providing a delay line of delay elements to delay individual samples and/or groups of samples of the incoming far end signal. For example, a delay line of block elements is used instead of a buffer in the Adaptive Filter 308 shown in FIG. 6 and the Shortened Filter 400 illustrated in FIG. 7. A buffer physically separate from the adaptive filter or incorporated into the filter is also contemplated by other preferred embodiments.

Preferably, yet another step (also not shown in FIG. 8) is performed according to the Method 500. In this additional step, the samples of the far end signal are aligned with the adjusted (preferably shortened) adaptive filter (see Step 550) in response to the final flat delay estimate average.

Preferably, still another step (not shown in FIG. 8) is performed according to the Method 500. The far end signal is adaptively filtered using the adjusted (preferably shortened) adaptive filter (see Step 550) to create a local replica of a far end signal echo to cancel the far end signal echo.

The present Method 500 for estimating and compensating for a flat delay portion of an echo channel characteristic in an echo canceller may be implemented according to FIGS. 5, 6, and 7. In a preferred embodiment of the Method 500, the CVG 460 performs the Step 510 of updating a filter coefficient vector of an adaptive filter (Adaptive Filter 308, Shortened Adaptive Filter 400) that models the echo channel characteristic. The Position Detector 470 performs the Step 520 of estimating an instant flat delay by analyzing the filter coefficient vector after each update. The Periodic Averager 480 performs periodic averages of the instant flat delay estimate (Step 530). The Level Detector 490 performs Step 540 of determining a final flat delay estimate average when the flat delay estimate average has converged. The CVG 460 performs the Step 550 of adjusting the adaptive filter length in response to the final flat delay estimate average.

As in the preferred embodiment just detailed, the Method 500 can be described with reference to the echo cancellation system 300 of FIG. 5, the Adaptive Filter 308 of FIGS. 5 and 6, and the Shortened Adaptive Filter 400 of FIG. 7. It should be understood, however, that the Method 500 is not limited to these embodiments.

It should be further understood with reference to the Method 500 and the echo cancellation system 300 and any and all embodiments thereof that the flat or round-trip delay estimation and compensation, in consideration of the fact that the flat or round-trip delay can vary during a telephone connection, preferably is performed on an ongoing basis, throughout and during a telephone connection as well as at the beginning of a telephone connection.

Still further, it should be understood that any or all of the Steps of the embodiments of the Method 500 and/or any or all of the elements of the embodiments of the echo cancellation system 300 (spanning FIGS. 5, 6, and 7) can be implemented via digital signal processing that performs the same or similar function or functions as the Steps and/or the elements; and/or on a digital signal processor.

An operating environment for the described embodiments of the Method 500 and System 300 includes a processing system with at least one high speed Central Processing Unit ("CPU") or other processing unit and a memory system. In accordance with the practices of persons skilled in the art of computer programming, the present invention is described below with reference to acts and symbolic representations of operations or instructions that are performed by the processing system, unless indicated otherwise. Such acts and operations or instructions are sometimes referred to as being "computer-executed", or "CPU executed."

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU or other processing unit. The computer readable medium includes cooperating or interconnected computer readable media, which exist exclusively on the processing system or are distributed among multiple interconnected processing systems that may be local or remote to the processing system. In particular, the Method 500 and any and all embodiments thereof can be executed by a processing unit in response to, or responsively to, instructions stored in or on a computer readable medium.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. In an echo canceller, a method for estimating and compensating for a flat delay portion of an echo channel characteristic comprising the steps of:

updating a filter coefficient vector of an adaptive filter that models the echo channel characteristic;

estimating an instant flat delay by analyzing the filter coefficient vector after each update;

performing periodic averages of the instant flat delay estimate;

determining a final flat delay estimate average when the flat delay estimate average has converged; and adjusting the adaptive filter length in response to the final flat delay estimate average.

2. A computer readable medium having stored therein instructions for causing a processing unit to execute the method of claim 1.

3. The method of claim 1, wherein the filter coefficient vector is updated according to a least mean square algorithm.

4. The method of claim 1 wherein the step of estimating the instant flat delay comprises analyzing the filter coefficient vector after each update and determining an index value of the filter coefficient having the largest magnitude.

5. The method of claim 1 wherein the step of estimating the instant flat delay comprises analyzing the filter coefficient vector after each update and determining a sequence of indices, wherein each index corresponds to the location of the filter coefficient having the largest magnitude.

6. The method of claim 1 wherein the step of performing periodic averages of the instant flat delay estimate calculates a weighted average of the instant flat delay estimates.

7. The method of claim 1 wherein the step of performing periodic averages of the instant flat delay estimate calculates a time average of the past Q instant flat delay estimates.

8. The method of claim 1 wherein the step of performing periodic averages of the instant flat delay estimate calculates an average according to a smoothing and noise reduction function.

9. The method of claim 5 wherein the step of performing periodic averages of the instant flat delay estimate is performed by filtering the sequence of indices to obtain a sequence of averages.

10. The method of claim 1 wherein the step of performing periodic averages of the instant flat delay estimate is performed by a filter.

11. The method of claim 10 wherein the filter is an integrator.

12. The method of claim 11 wherein the integrator integrates the instant flat delay estimate for an integration time Tint.

13. The method of claim 10 wherein the filter is a recursive filter.

14. The method of claim 10 wherein the filter is an FIR filter.

15. The method of claim 1 wherein comparing an absolute difference value of the most recent instant flat delay estimate and the flat delay estimate average to a threshold value is indicative of convergence.

16. The method of claim 1 wherein the flat delay estimate average has converged when an absolute difference value of the most recent instant flat delay estimate and the flat delay estimate average does not exceed a threshold value.

17. The method of claim 1 wherein the final flat delay estimate average is determined when the flat delay estimate average has converged and has satisfied an energy requirement.

18. The method of claim 17 wherein the flat delay estimate average has satisfied the energy requirement when a sufficient amount of energy of the updated filter coefficient vector is concentrated in the vicinity of the flat delay estimate average.

19. The method of claim 17 wherein the flat delay estimate average has satisfied the energy requirement when a calculated ratio, of the energy of the filter coefficients within a range surrounding the flat delay estimate average to the energy of all of the filter coefficients of the updated filter coefficient vector, exceeds a threshold value.

20. The method of claim 17 wherein comparing a calculated ratio, of the energy of the filter coefficients within a range surrounding the flat delay estimate average to the energy of all of the filter coefficients of the updated filter coefficient vector, to a threshold value, is indicative of satisfying the energy requirement.

21. The method of claim 19 wherein the flat delay estimate average has converged when an absolute difference value of the most recent instant flat delay estimate and the flat delay estimate average does not exceed a second threshold value.

22. The method of claim 20 wherein comparing an absolute difference value of the most recent instant flat delay estimate and the flat delay estimate average to a second threshold value is indicative of convergence.

23. The method of claim 1 wherein adjusting the adaptive filter in response to the final flat delay estimate average comprises shortening the adaptive filter by replacing a beginning portion of the adaptive filter with a bulk delay element.

24. The method of claim 23 wherein the beginning portion of the shortened adaptive filter is determined by using the first filter coefficient of the filter coefficient vector trough to a filter coefficient that is located at a safety margin prior to the filter coefficient indicated by the final flat delay estimate average.

25. The method of claim 24 wherein the safety margin comprises a predetermined number of filter coefficients.

26. The method of claim 23 further comprising the steps of:
receiving a far end signal into a buffer; and
aligning the samples of the far end signal with the shortened adaptive filter in response to the final flat delay estimate average.

27. The method of claim 1 further comprising the steps of:
receiving a far end signal into a buffer, and adaptively filtering the far end signal using the adjusted adaptive filter to create a local replica of a far end signal echo to cancel the far end signal echo.

28. The method of claim 23 further comprising the steps of:
receiving a far end signal into a buffer; and
adaptively filtering the far end signal using the shortened adaptive filter to create a local replica of a far end signal echo to cancel the far end signal echo.

29. In an echo canceller, a method for estimating and compensating for a flat delay portion of an echo channel characteristic comprising the steps of:
receiving a far end signal into a buffer;
updating a filter coefficient vector h of an adaptive filter of initial length N that models the echo channel characteristic;
estimating an instant flat delay by analyzing the filter coefficient vector h after each update and determining an index value of the filter coefficient having the largest magnitude;
performing periodic averages of the instant flat delay estimate;
determining a final flat delay estimate average when the flat delay estimate average has converged and has satisfied an energy requirement;
shortening the adaptive filter length in response to the final flat delay estimate average; and
adaptively filtering the far end signal using the shortened adaptive filter to create a local replica of a far end signal echo to cancel the far end signal echo.

30. A computer readable medium having stored therein instructions for causing a processing unit to execute the method of claim 29.

31. The method of claim 29, wherein the filter coefficient vector h is updated according to a least mean square algorithm.

32. The method of claim 29, wherein the initial length N is not less than an expected value of the entire delay of the echo channel characteristic.

33. The method of claim 32, wherein the index value of the filter coefficient having the largest magnitude is determined according to:

$$d_{inst} = \arg\max(|h_i(n)|) \text{ for } i=0,1,\ldots,N-1,$$

wherein i is the index value of the i th filter coefficient of the adaptive filter of initial length N, $|h_i(n)|$ is the absolute value of the i th filter coefficient of the filter coefficient vector h, and $d_{inst}$ is an instant flat delay estimate.

34. The method of claim 33, wherein performing periodic averages of the flat delay estimate comprises averaging the instant flat delay estimate $d_{inst}$ according to:

$$rtd(n) = [1-\beta]rtd(n-1) + \beta d_{inst},$$

wherein rtd(n) is a flat delay estimate average, rtd(n−1) is a previous value of the flat delay estimate average, β is a weighting factor for the averaging and does not exceed one, and the averaging is repeated for a predetermined time $T_{avg}$.

35. The method of claim 34, wherein the flat delay estimate has converged when an absolute difference value of the most recent instant flat delay estimate $d_{inst}$ and the flat delay estimate average rtd(n) does not exceed a threshold value.

36. The method of claim 34, wherein the flat delay estimate average has satisfied the energy requirement when a calculated ratio of the energy of the filter coefficients within a range surrounding the flat delay estimate average to the energy of all of the filter coefficients of the updated filter coefficient vector, exceeds a threshold value.

37. The method of claim 36, wherein the range surrounding the flat delay it) estimate average has a length $N_e$ that is less than the initial length N of the adaptive filter.

38. The method of claim 37, wherein the ratio is calculated according to the following equations and relationships:

$$E_{peak} = \sum_{rtd(n)-N_e/2}^{rtd(n)+N_e/2} (h_i(n))^2,$$

$$E_h = \sum_{i=0}^{N-1} (h_i(n))^2,$$

and $N_e < N$, wherein $E_{peak}$ is the energy of the filter coefficients within the range having length $N_e$ and surrounding the flat delay estimate average, $E_h$ is the energy of all of the filter coefficients of the updated filter coefficient vector, and $E_{peak}|E_h$ is the calculated ratio.

39. In an echo canceller, an improved adaptive filter that estimates and compensates for a flat delay portion of an echo channel characteristic comprising:

a series of delay elements, wherein the series of delay elements receives a far end signal;

a filter summer having initial length N, a coefficient vector generator; wherein the coefficient vector generator updates a filter coefficient vector, and wherein the coefficient vector generator, responsive to a final flat delay estimate, shortens the filter summer and the filter coefficient vector and provides a bulk delay element to replace a portion of the series of delay elements;

a position detector, wherein the position detector provides an instant flat delay estimate corresponding to the location of the filter coefficient having the largest magnitude after each update of the filter coefficient vector;

a periodic averager, wherein the periodic averager averages the instant flat delay estimate; and a level detector, wherein the level detector determines:
that the instant flat delay estimate average from the periodic averager has converged, and also determines;
a final flat delay estimate average, responsive to the periodic averager when the instant flat delay estimate average has converged.

40. An improved echo canceller that compensates for a flat delay portion of an echo channel characteristic, comprising:

an adaptive filter having an initial length N, a position detector connected to said adaptive filter for locating the position of the maximum valued filter tap;

a periodic averager connected to said position detector to provide an average of the location position; and a level detector, wherein the level detector determines:
that the instant flat delay estimate average from the periodic averager has converged, and also determines;
a final flat delay estimate, D, responsive to the periodic averager when the instant flat delay estimate average has converged;

wherein said adaptive filter responsively to the final flat delay estimate shortens from the initial length N to a length N−D.

* * * * *